Sept. 22, 1931.  L. E. LA BRIE  1,824,051
BRAKE
Filed June 20, 1927
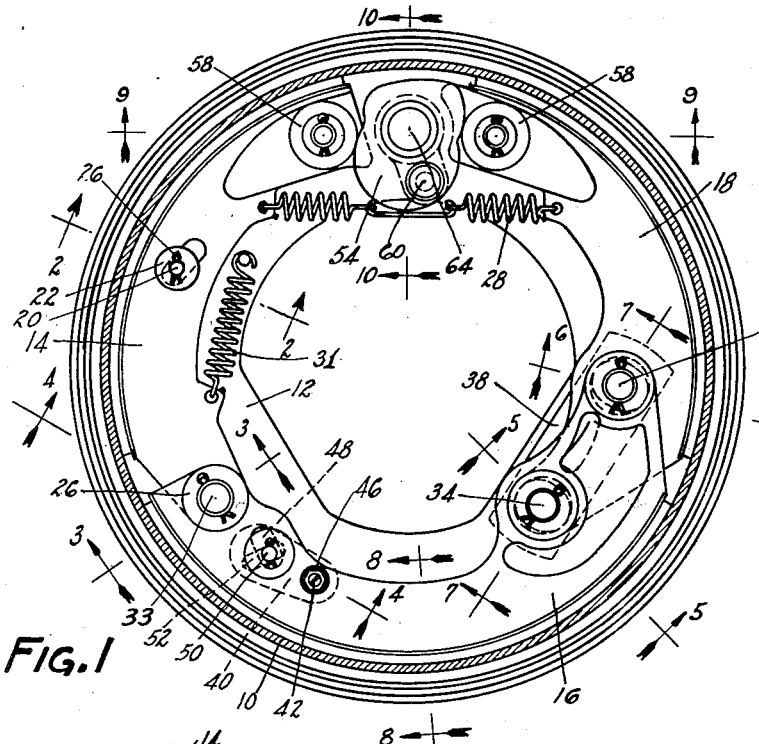
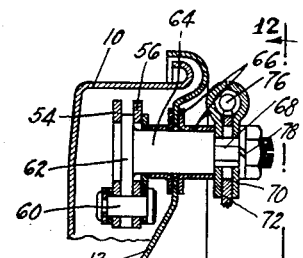
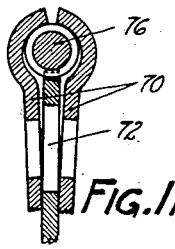
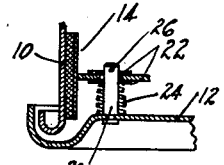
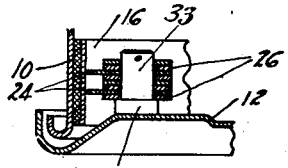
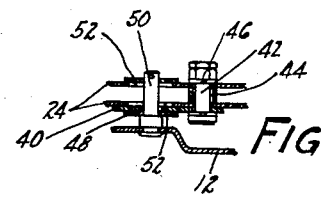
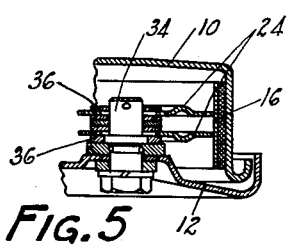
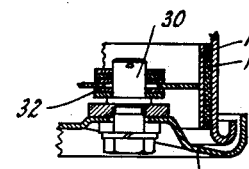
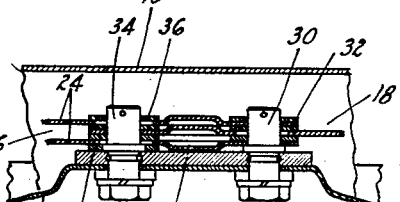
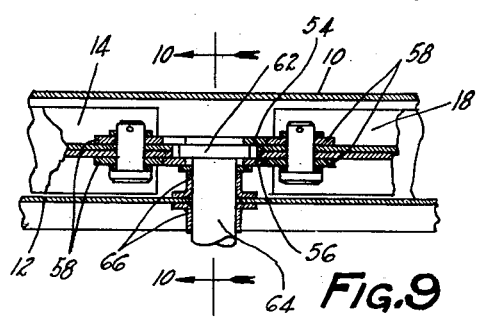
INVENTOR
LUDGER E. LA BRIE
BY
ATTORNEY Patented Sept. 22, 1931

1,824,051

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed June 20, 1927. Serial No. 199,999.

This invention relates to brakes and is illustrated as embodied in an internal expanding automobile brake. An object of the invention is to provide simple and inexpensive but efficient operating means for applying the brake.

In one desirable arrangement there are a pair of cams or equivalent applying devices engaging opposite sides of the unanchored ends of the shoes which preferably comprise the friction means of the brake, in operative engagement with thrust devices such as rollers on opposite sides of said ends. Thus the cams serve to hold the shoes against lateral movement, as well as to apply the brake. The illustrated cams are arranged to be shiftable between the shoes to balance pressures in opposite directions, but are held against sidewise movement so that there is no interference with the positioning of the brake shoes.

I prefer to operate the cams or their equivalents by a shaft or the like having an arm between the cams and operatively engaging them at one side of their axis, as for example by means of a pivot which permits the above-described shifting.

Another important feature of novelty relates to a simplified adjusting device for an arm on the cam shaft, although the novelty of this adjustment is not limited to its use on the cam shaft of a brake. Preferably there are three members arranged side by side on a shaft, the outside members being fixed on the shaft and the center member being angularly movable and formed with rack teeth meshing with an adjusting member supported by the outside members. The outside members are arranged to have wedging engagement with the adjusting member and to be clamped against it under considerable tension by a nut threaded on the end of the shaft after the adjustment is made, thus providing a strong joint.

The above and other objects and features of the invention, including various novel and desirable details of construction, will be apparent from the following description of one illustrative embodiment shown in the accompanying drawings, in which:

Figure 1 is a vertical section through the brake, just inside the head of the brake drum and showing the brake shoes in side elevation;

Figure 2 is a partial section on the line 2—2 of Figure 1 and showing a steady rest for one of the shoes;

Figure 3 is a partial section on the line 3—3 of Figure 1 and showing a joint between the primary and secondary shoes;

Figure 4 is a partial section on the line 4—4 of Figure 1 showing an automatically adjusted positioning device for the secondary shoe;

Figure 5 is a section through one of the brake anchors on the line 5—5 of Figure 1;

Figure 6 is a section through the other brake anchor on the line 6—6 of Figure 1;

Figure 7 is a partial section through both anchors on the line 7—7 of Figure 1;

Figure 8 is a section through the secondary shoe on the line 8—8 of Figure 1;

Figure 9 is a partial section through the brake-applying means on the line 9—9 of Figure 1;

Figure 10 is a partial section through the brake-applying means on the line 10—10 of Figures 1 and 9;

Figure 11 is a view of the three side by side members on the cam shaft on a larger scale than in Figure 10; and Figure 12 is a section showing the novel adjustment on the line 12—12 of Figure 10.

The brake selected for illustration comprises a rotatable drum 10, at the open side of which is arranged a suitable stationary support such as a backing plate 12 and within which is arranged the friction means of the brake, illustrated as comprising a primary shoe 14, a secondary shoe 16, and an auxiliary shoe 18.

The central part of the primary shoe 14 is positioned laterally by a steady rest shown in Figure 2 and including a pin 20 carried by the backing plate and provided with a pair of washers 22 on opposite sides of the web of the shoe 14 and held in resilient engagement therewith by a coil spring 24 urging the washers outwardly as far as permitted by a cotter pin 26.

The shoes 14 and 18 are urged inwardly away from the drum toward idle position by a return spring 28 connecting them, and the shoe 16 is urged away from the drum toward idle position by an auxiliary return spring 31 connected to the shoe 14 and acting on the shoe 16 through a pivot connection 33. The details of the mounting of the pivot 33 are shown in Figure 3. Shoe 14 is T-shaped in section, as appears in Figure 2, and extends between two webs 24 (Figure 8) of shoe 16. The two webs 24 and the web of shoe 14 have washers 26 welded on their faces to give a more extended bearing for engagement with the pivot 22. The pivot 22 preferably has a relatively large head 28 slidably engaging the backing plate 12.

Shoe 16 is anchored at its end on a fixed pivot 30 carried by the backing plate 12 and passing through a relatively large opening 32 (Figure 6) in the web of shoe 18. Shoe 18 is anchored on a fixed pivot 34 also carried by the backing plate 12 and passing through relatively large openings 36 in the webs 24 of shoe 16. The anchors 30 and 34 may, if desired, be connected by a reinforcing plate 38 as shown in Figure 7.

The idle position of the secondary shoe 16 is preferably determined automatically by an adjustable stop shown in Figures 1 and 4. This stop includes a plate 40 pivotally secured at one end to the shoe by a pivot 42 passing through a spacer 44 between the webs 24 and clamped tightly by a nut 46, so that normally the plate 40 is held frictionally against moving, although it can be shifted when considerable force is applied. At its opposite end the plate 40 is formed with a slot 48 for a steady rest pin 50 carried by the backing plate 12 and passing through relatively large openings 52 in the webs 24 so that it does not interfere with the movement of the shoe 16. The slot 48 is just wide enough to permit the desired maximum brake-applying movement of the shoe 16. Further movement of the shoe, due to excessive wear of the brake lining, will cause the inner edge of the slot 48 to engage the fixed pin 50, thus shifting the plate 40 about the pivot 42 as the brake-applying movement of the shoe continues. Thereafter when the brake is released again, after the usual predetermined releasing movement of the shoe, the outer edge of the slot 48 will engage the pin 50, which thus serves as a fixed stop determining the idle position of the shoe.

The brake is arranged to be applied, against the resistance of springs 28 and 30, by novel means shown in Figures 1, 9, and 10-12. This means preferably includes a pair of applying devices such as cams 54 and 56, which may be flat steel stampings having the desired outline, and which engage opposite sides of the ends of the shoes 14 and 18 or their equivalents to prevent lateral movement of the shoes without the provision of any special means such as steady rests. The cams 54 and 56 are in operative engagement with thrust devices such as rollers 58 pivotally mounted on opposite sides of the shoes or their equivalents.

Preferably the cam 54 and 56, or their equivalents, are operatively connected by a pivot 60 to an arm 62 between the cams and which may be integral with a cam shaft 64 journalled in a novel bearing formed by two stampings 66 shown as welded to opposite sides of the backing plate 12.

The end of the shaft 64 is provided with a flattened portion 68 upon which are arranged two outside members 70 which interengage with the flat portions of the shaft so that they cannot turn angularly on the shaft, and between which is a center member or brake-applying arm 72 which is angularly movable on the shaft, and which is formed at its upper edge with a segmental rack having teeth 74 meshing with a worm or gear member such as an adjusting device 76 which is supported by registering grooves formed in the ends of the members 70. As best appears in Figure 11, these grooves are so formed as to have a wedging action on the adjusting member 76, pulling it firmly down against the teeth 74 when a nut 78 threaded on the end of the shaft 64 is tightened up to compress the members 70 against opposite sides of the arm 72. The adjusting member 76 is shown with integral heads 80 on its opposite ends, for engagement with the sides of the members 70 to prevent endwise movement of the adjusting member. This adjustable lever forms the subject matter of my divisional application, Serial No. 520,812, filed March 7, 1931.

While one illustrative embodiment of the invention has been described in detail, it is not my intention to limit its scope to that particular embodiment or otherwise than by the terms of the appended claims.

I claim:

1. A brake comprising, in combination, friction means having adjacent ends provided on their opposite sides with thrust devices, and a pair of separate applying devices engaging the opposite sides of said ends to hold the friction means against lateral movement and operatively engaging the thrust devices.

2. A brake comprising, in combination, friction means having adjacent ends provided on their opposite sides with thrust devices, and a pair of separate cams engaging the opposite sides of said ends to hold the friction means against lateral movement and operatively engaging the thrust devices.

3. A brake comprising, in combination, friction means having adjacent ends provided on their opposite sides with thrust devices, a pair of applying devices engaging the opposite sides of said ends and engaging the thrust devices, and an operating arm between the applying devices and in operative engagement therewith at one side of their axis.

4. A brake comprising, in combination, friction means having adjacent ends provided on their opposite sides with thrust devices, a pair of applying devices engaging the opposite sides of said ends and engaging the thrust devices, and a shaft having an arm between the applying devices and interengaging with the applying devices.

5. A brake comprising in combination, friction means having adjacent ends provided on their opposite sides with thrust devices, a pair of separate applying devices engaging the opposite sides of said ends and engaging the thrust devices, and a shaft arranged to operate the applying devices, the applying devices being shiftable with respect to the shaft to balance the pressures on the thrust devices.

6. A brake comprising, in combination, friction means having adjacent ends provided on their opposite sides with thrust devices, a pair of separate applying devices engaging the opposite sides of said ends and engaging the thrust devices, a shaft arranged to operate the applying devices through an intermediary of an operating arm and in operative engagement therewith at one side of their axis, the applying devices being shiftable with respect to the shaft to balance the pressures on the thrust devices.

In testimony whereof, I have hereunto signed my name.

LUDGER E. LA BRIE.